United States Patent
McClure et al.

(10) Patent No.: US 7,538,450 B2
(45) Date of Patent: May 26, 2009

(54) POWER SWITCH DEVICE AND METHOD FOR CLUSTER COMPUTER

(75) Inventors: John McClure, Taipei (TW); Chi Jung Lo, Taipei (TW)

(73) Assignee: Mitac International Corp., Hsinchu County (TW)

(*) Notice: Subject to any disclaimer, the term of this patent is extended or adjusted under 35 U.S.C. 154(b) by 301 days.

(21) Appl. No.: 11/527,535

(22) Filed: Sep. 27, 2006

(65) Prior Publication Data
US 2007/0290663 A1    Dec. 20, 2007

(30) Foreign Application Priority Data
Jun. 16, 2006   (TW) ............... 95121501 A

(51) Int. Cl.
  *H02J 7/00*   (2006.01)
  *G06F 1/32*   (2006.01)
(52) U.S. Cl. .................. 307/65; 713/324
(58) Field of Classification Search ......... 323/222, 323/271, 282; 363/37, 71; 307/43, 64, 65; 713/300–340
See application file for complete search history.

(56) References Cited
U.S. PATENT DOCUMENTS
6,151,649 A    11/2000   Liong et al.
6,212,081 B1 *   4/2001   Sakai ........................ 363/71
6,476,589 B2 *  11/2002   Umminger et al. ........ 323/282
7,400,064 B2 *   7/2008   Hoon et al. ................ 307/39

OTHER PUBLICATIONS

Cisco Systems, Inc.; "Cluster Computing"; copyright 2005 Cisco Systems, Inc.; EDCS-427415; pp. 1-14.*

* cited by examiner

Primary Examiner—Jessica Han
Assistant Examiner—Emily Pham
(74) Attorney, Agent, or Firm—Rabin & Berdo, P.C.

(57) ABSTRACT

A power switch device and method for a cluster computer is described. A power input circuit receives plural input powers and plural state signals corresponding to the input powers. A first output circuit supplies the input powers to a head node and at least one compute node. A second output circuit supplies the input powers to the head node. A gate produces a switch signal according to the state signals. According to the switch signal, a switch module connects the power input circuit to the first output circuit or the second output circuit. And a spare power module, connected to the first and second output circuits, stores a spare power charged from the first output circuit and supplies the spare power to the second output circuit during a switch period.

19 Claims, 4 Drawing Sheets a
POWER SWITCH DEVICE AND METHOD FOR CLUSTER COMPUTER

BACKGROUND OF THE INVENTION

1. Field of Invention

The present invention relates to a device and method for electricity switching, and more particularly, to a power switch device and method for a cluster computer.

2. Related Art

Stable power source is one of the most significant considerations to a computer system, especially to those applied to the field of high performance computing (HPC). Currently, to provide electricity steadily and avoid unexpected shutdown, a super computer with hundreds of nodes utilizes a large UPS (uninterrupted power system, UPS) as an external AC-to-AC power supply system. However, the external UPS is not capable of solving any power supply problems happening inside the computer system.

Except the external power supply system, an internal AC (alternating current)-to-DC (direct current) RPS (redundant power system) also keeps the computer system operating without interruptions. The primary features of a RPS are at-least-two power suppliers and hot-swap support. Therefore, when any of the operating power suppliers is failed or disconnected, the computer system will remain operative; which means each of the power suppliers in a RPS has to be capable of independently supplying all the electricity required by the computer system. Accordingly, the power supplier applied in a RPS supplies higher power, along with larger volume and high cost.

However, for low-nodes cluster computer, the internal RPS is not perfectly applicable. Please refer to FIG. 1, which illustrates a personal super computer (PSC) for personalized HPC that has applications in small-scale computing fields such as graphic processing, model analysis and research simulation. In FIG. 1 the PSC includes five mother boards; one operates as a head node 80, while the rest four are performed as compute nodes 82. A first power supplier 70 and a second power supplier 71 supply and distribute electricity through a power distribution circuit 90 to the head node 80 and the four compute nodes 82. However, PSC is a performance-oriented, density-oriented and cost-oriented product. If the first power supplier 70 and the second power supplier 71 are designed according to the system architecture of RPS, the problems of space distribution and cost will come along. Oppositely, if the RPS architecture is not utilized, the reliability will go down.

For example, each of the first and second power suppliers 70 and 71 provides 850 W, total 1700 W of electricity. Each of the compute nodes 82 needs 280 W, while the head node 80 needs 450 W; the whole system will then need 1570 W. When the first supplier 70 fails suddenly, the whole system will lost 850 W electricity in an extremely short time. If the whole system still shares the remaining 850 W electricity, then the power left for each node will be 170 W, which is obviously too much blow the required power for each node. That will cause the computer system an abnormal shutdown with irrecoverable data damage and serious task interruptions. At the moment, even the external UPS still provides with AC as usual, DC spare power is not available.

That proves that the power supplier in the prior art exists a contradiction between space distribution, cost control and reliability. Therefore, the issue becomes critical about how to improve the architecture of the power supply system in the prior art, providing the same power with a downsized volume and lower cost, and securing the data during the sudden power-off or abnormal shutdown duration.

SUMMARY OF THE INVENTION

Accordingly, the present invention provides a power switch device and method for cluster computer.

The power switch device for cluster computer according to the present invention includes a power input circuit, a first output circuit, a second output circuit, a gate, a switch module and the spare power module.

The power input circuit receives input powers and state signals corresponsive to the input power from power suppliers. The gate generates a switch signal according to the state signal, while the switch module electrically connects the power input circuit to one of the first output circuit and the second output circuit according to the switch signal.

When all the state signals indicate all the input power are in a power-on state, the switch module electrically connects to the first output circuit, by which outputting the input powers to the head node and the compute nodes. On the other hand, when at least one of the state signals indicates that at least one of the input powers fails, the switch module electrically connects to the second output circuit, by which outputting the remaining input power to the head node.

The spare power module electrically connects to the first output circuit and the second output circuit, charging and storing a spare power through the first output circuit. During a switch period of the switch module, the spare power module provides the stored spare power to the second output circuit.

The power switch method according to the present invention is applied to a first output circuit and a second output circuit of a cluster computer. The first output circuit supplies electricity to a head node and at least one compute node, while the second output circuit supplies electricity to the head node. The method includes the following steps: receiving plural input powers and plural state signals corresponsive to the input powers; confirming according to the state signals whether any of the input powers is in a power-off state; switching the remaining input power from the first output circuit to the second output circuit; providing a spare power through the second output circuit to the head node during a switch period of said switching step; and supplying the remaining input power to the head node through the second output circuit.

Consequently, the power switch device and method according to the present invention provides high density, low cost and high reliability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
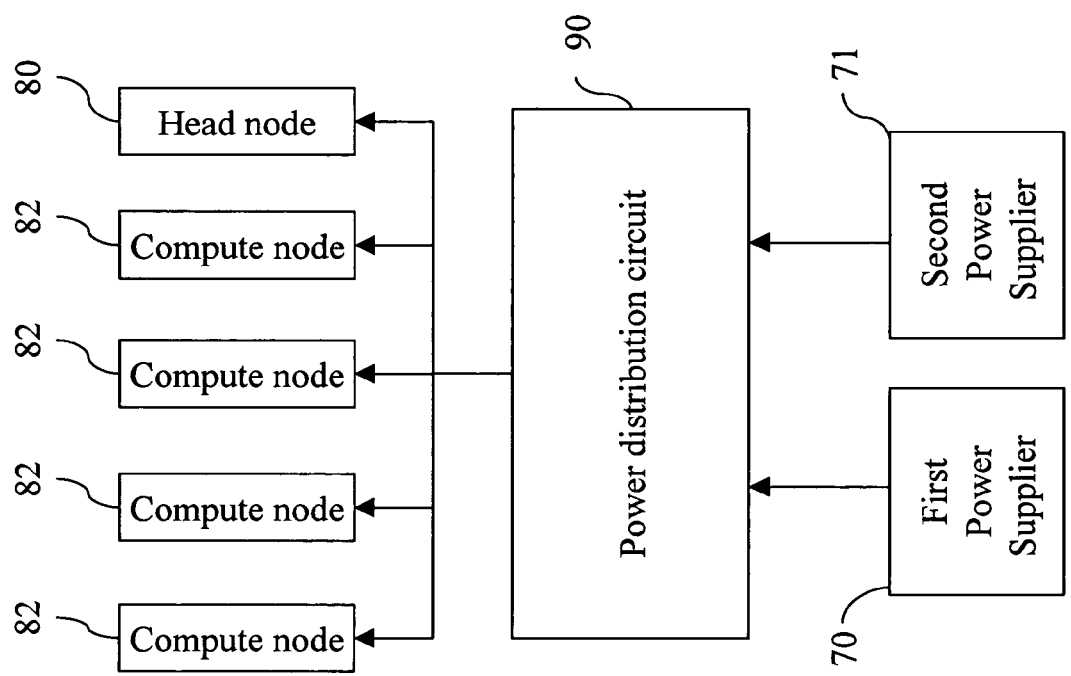
FIG. 1 shows a cluster computer and its internal spare power system in the prior art.
Figure 2:
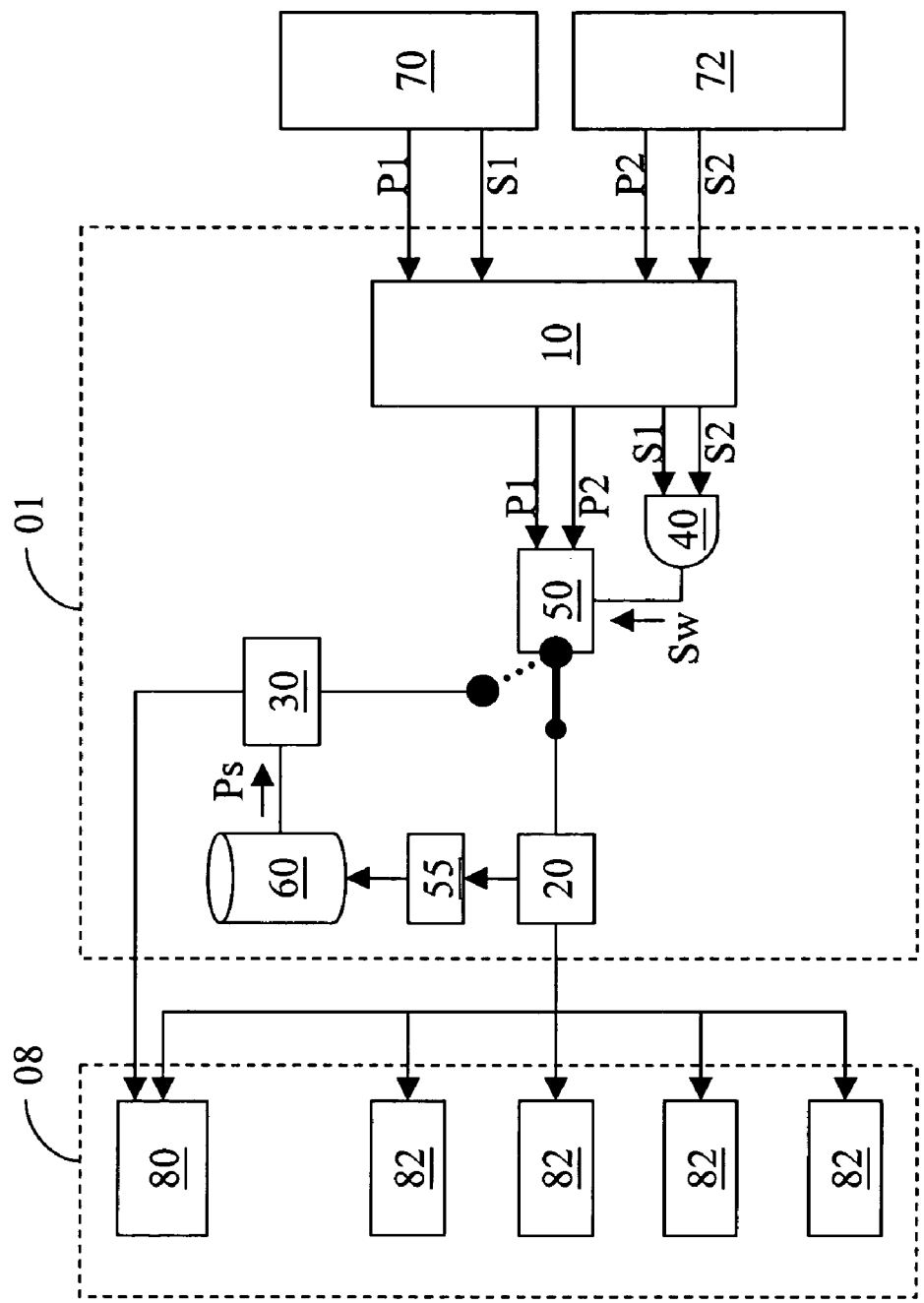
FIG. 2 shows the first embodiment of a power switch device for cluster computer according to the present invention.

Please refer to FIG. 2, which illustrates the first embodiment of a power switch device for a cluster computer according to the present invention.

A cluster computer 08 includes a head node 80 and compute nodes 82. The head node 80 and the compute nodes 82 may be computer systems of single or multiple processors configured on five individual mainboards. The head node 80 manages the four compute nodes 82 to perform the tasks of cluster computing. The electricity required by the cluster computer 08 is provided by a the first power supplier 70 and a second power supplier 72. A power switch 01 is utilized to transform voltages, distribute electricity and switch between different power-supply mechanisms.

Generally, in the embodiment the first power supplier 70 and the second power supplier 72 has to supply electricity together to all the power loads of the head node 80 and all the compute nodes 82. Namely, neither the first power supplier 70 nor the second power supplier 72 can supply enough electricity to the whole cluster computer 08 independently.

The power supply device 01 includes a power input circuit 10, a first output circuit 20, a second output circuit 30, a gate 40, a switch module 50 and the spare power module 60.

The power input circuit 10 electrically connects the first power supplier 70, the second power supplier 72, the gate 40 and the switch module 50. As to power distribution, the power input circuit 10 receives input powers P1 and P2 (provided by the first power supplier 70 and the second power supplier 72), and transmit to the switch module 50. State signals S1 (such as PSON1_L) and S2 (such as PSON2_L) corresponsive to the input powers P1, P2 are transmitted to the gate 40 respectively.

The gate 40, in circuit connection with the first power supplier 70, the second power supplier 72 and the switch module 50, generates a switch signal Sw according to the state signals S1, S2 of the input powers P1, P2, and transmits to the switch module 50.

The switch module 50 is in circuit connection with the first power supplier 70, the second power supplier 72 and the gate 40. In the present embodiment, the switch module 50 is predetermined to be in circuit connection with the first output circuit 20. The switch module receives the switch signal Sw of the gate 40 to remain the power input circuit 10 connecting electrically with the first output circuit 20, or to switch for connecting with the second output circuit 30.

The first output circuit 20 electrically connects with the switch module 50, the head node 80 and each of the compute nodes 82, to output the input powers P1, P2 together and distribute to the head node 80 and each of the compute nodes 82. The second output circuit 30 electrically connects to the switch module 50, the head node 80 and the spare power module 60, to output the remaining input power P1 or P2, or the spare power Ps of the spare power module 60 to the head node 80.

The spare power module 60, electrically connecting to the first output circuit 20 and the second output circuit 30, is charged by the first output circuit 20 to store a spare power Ps. The spare power Ps is supplied to the head node 80 through the second output circuit 30 during a switch period of the switch module 50. The spare power module 60 may include various types of capacitors (including ultra-capacitor) or modules thereof, which has enough capacitance to independently supply the electricity required by the head node 80 for a short specific duration (longer than the switch period).

The switch 55 located between the first output circuit 20 and the spare power module 60 is used for limiting the direction of the current, which may be realized by a MOS switch or a diode switch. As long as the algorism of power supply is designated to provide electricity only to the head node 80 while the input power P1 or P2 fails, the switch 55 will allow the spare power module 60 to be charged by the first output circuit 20, and prevent from discharging to the first output circuit 20 and the four compute nodes 82 during the switch period. Therefore, the spare power module 60 only needs to supply less power (only for the head node 80). However, in another case, if the spare power module 60 is designed to discharge to the first output circuit 20 and the four compute nodes 82, the switch 55 will not be necessary any more; only the spare power module 60 will need to supply more power load that is close to the sum of the power loads of the two power suppliers 70, 72.

When both the input powers P1, P2 are in a power-on state, the corresponsive state signals S1, S2 will be in a specific power-on logic level of the supplied voltage (such as PSON1_L (S1), PSON2_L (S2) under logic LOW) to allow the switch signal Sw generated by the gate 40 to control the switch module 50 to maintain the electrical connection with the first output circuit 20. When one of the input powers P1, P2 is in power-off state, the corresponsive state signals S1, S2 will be in a specific power-off logic level of the supplied voltage (such as PSON1_L (S1), PSON2_L (S2) under logic HIGH) to allow the switch signal Sw generated by the gate 40 to control the switch module 50 to switch to the electrical connection with the second output circuit 30. To achieve the switch controls as mentioned above, the gate 40 may be an AND logic gate, while the switch module 50 may be a relay.

For the power supply device 01 disclosed in the present invention, when both of the state signals S1, S2 indicate the input powers P1, P2 are in the power-on state, the switch module 50 will keep the power input circuit 10 electrically connecting to the first output circuit 20. Meanwhile, through the first output circuit 20, both the input powers P1, P2 will be output to the head node 80 and each of the compute nodes 82. At the moment, the spare power module 60 will be charged and storing the spare power through the first output circuit 20.

When the state signals S1, S2 indicate any of the input powers P1, P2 fails, the switch module 50 will switch the power input circuit 10 to electrically connect to the second output circuit 30. At the moment, the remaining input power P1 or P2 can not independently fulfill the electricity demand of the head node 80 and all of the compute nodes 82. Consequently, the switch module 50 will switch the power input circuit 10 to electrically connect to the second output circuit 30, thereby outputting the remaining input power P1 or P2 to the head node 80 through the second output circuit 30.

Generally during the switch period, the switch module 50 needs several milliseconds for switch operation, so without connecting with the power input circuit 10 the first output circuit 20 and the second output circuit 30 will not be supplied with electricity in milliseconds. In addition, at the initial stage the power supply state is still unstable. Then, the spare power Ps provided by the spare power module 60 will be output to the head node 80 through the second output circuit 30 to maintain normal power supply for the head node 80. Therefore the head node 80 will be able to process the task interruptions of each of the compute nodes 82, and to store the final operating data of the compute nodes 82 that are sent back before the compute nodes 82 shut down. That is why the spare power module 60 in the present invention needs to be capable of independently supplying the electricity required by the head node 80 during the specific duration.

Besides, about the selection on power suppliers, the sum of the output powers of the aforesaid first and second power suppliers 70, 72 equals to the sum of the output powers required by the head node 80 and all the compute nodes 82 plus a safe value.

For example, as shown in FIG. 2, the head node 80 needs 450 W power, while each of the four compute nodes 82 needs 280 W power; the whole system will need 1570 W power. By way of using the power supply device 01 of the cluster computer 08 according to the present invention, each of the first power supplier 70 and the second power supplier 72 needs only to provide about 850 W power, with a safe value of 130 W power. Thus, the reliability of the whole power supply system may be maintained; unlike the RPS (redundant power system) in the prior art that each power supplier needs to provide 1570 W power, along with higher cost and space configuration problems.

Figure 3:
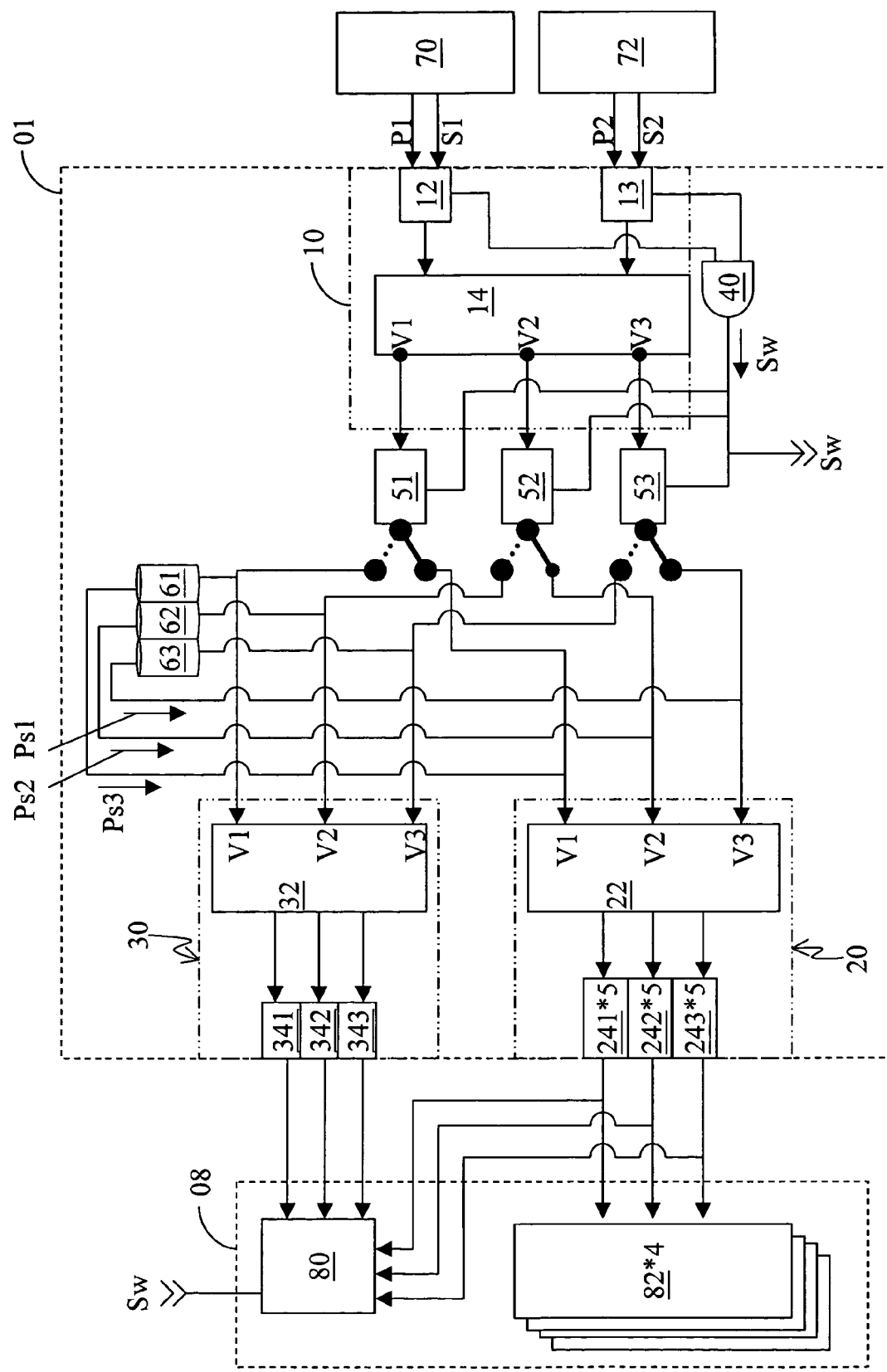
FIG. 3 shows the second embodiment of a power switch device for cluster computer according to the present invention.

Please refer to FIG. 3, which illustrates the second embodiment of the power supply device for cluster computer. Practically, all the nodes of the cluster computer would possibly need several different operation voltages for various components. Thus, the spare power module will need to provide the spare power with different voltages, and the DC-DC voltage distribution capability also needs to be fulfilled.

Accordingly, the major differences between the present embodiment and the former one, is that the power supply device 01 of the present invention further includes a DC (direct current) voltage distribution circuit 14, a first distribution circuit 22 and a second distribution circuit 32 to distribution the input powers P1, P2 into three voltages V1, V2, V3 for each nodes. Three switch modules 51, 52, 53 for the voltages V1, V2, V3 and three spare power modules 61, 62, 63, are also included to enable the circuit switch control for the different voltages V1, V2, V3 and to supply three different spare powers Ps1, Ps2 and Ps3.

Except connecting with the gate 40, the first power supplier 70 and the second power supplier 72, the power input circuit 10 is also in circuit connection with the three switch modules 51, 52, 53. The power input circuit 10 includes input connection units 12, 13 and the DC voltage distribution circuit 14.

The input connection units 12, 13 are power connectors, receiving the input powers P1, P2 and the state signals S1, S2 provided by the first power supplier 70 and the second power supplier 72.

The DC voltage distribution circuit 14, electrically connecting to the input connection units 12, 13, distributes the input powers P1, P2 into the different voltages V1, V2, V3 (such as 3.3V, 5V, 12V), and then transmits to the switch modules 51, 52, 53. For those skilled in the art, the DC voltage distribution circuit 14 may be integrated in the first power supplier 70 and the second power supplier 72, only needs to provide dedicated power connectors for different voltages. Therefore, the DC voltage distribution circuit 14 is not absolutely essential for the power supply device 01 to implement thereon.

The first output circuit 20 includes the first distribution circuit 22 and the first output connection units 241, 242, 243. The first distribution circuit 22 is to electrically connect with the switch modules 51, 52, 53 and the spare power modules 61, 62, 63, to receive the input powers that the DC voltage distribution circuit 14 transmits to the switch modules 51, 52, 53.

The first output connection units 241, 242, 243, including plural power connectors with different voltages, electrically connect the first distribution circuit 22, the head node 80 and the four compute nodes 82, to output the input powers to the head node 80 and all of the compute nodes 82.

The second output circuit 30 includes the second distribution circuit 32 and the second output connection units 341, 342, 343. The second distribution circuit 32 electrically connects the switch modules 51, 52, 53 and the spare power modules 61, 62, 63, to receive the input powers transmitted from the DC voltage distribution circuit 14 to the switch modules 51, 52, 53.

The second output connection units 341, 342, 343, including plural power connectors of different voltages, electrically connects the second distribution circuit 32 and the head node 80 to output the remaining input power to the head node 80.

The switch modules 51, 52, 53 switch according to the switch signal of the gate 40 and for different voltages respectively, to keep the power input circuit 10 electrically connecting to the first output circuit 20, or to switch to the second output circuit 30.

The spare power modules 61, 62, 63, electrically connecting to the different voltages portions V1, V2, V3 of the first output circuit 20 and the second output circuit 30, are charged by the first output circuit 20 in accordance with dedicated voltages to store the spare powers Ps1, Ps2, Ps3. During the switch periods of the switch modules 51, 52, 53, the spare powers Ps1, Ps2, Ps3 are provided to the second output circuit 30.

Take the power supply mechanism of voltage V1 as an example. The input powers P1 and P2 provided by the first power supplier 70 and the second power supplier 72 are received through the input connection units 12, 13, and then distributed by the DC voltage distribution circuit 14 into different voltages V1, V2 and V3 for each node. When both the state signals S1, S2 indicate the input powers P1, P2 are in the power-on state, the switch module 51 will keep the voltage V1 part of the power input circuit 10 electrically connecting to the voltage V1 part of the first output circuit 20. Therefore, the distributed input power (voltage V1) will be transmitted through the switch module 51, the first distribution circuit 22, to the first output connection unit 241, and will eventually arrive the head node 80 and the compute nodes 82. Meanwhile, the spare power module 61 is charged and storing the spare power as well.

When the state signals S1, S2 indicate any of the input powers P1, P2 is in the power-off state, the switch module 51 will switch the voltage V1 part of the power input circuit 10 to electrically connect to the second output circuit 30. At the moment since a part of the input powers are interrupted, the remaining input power can not independently fulfill the electricity requirement of the head node 80 and all the four compute nodes 82. Accordingly, the second distribution circuit 32 has to transmit the remaining input power of voltage V1 through the second output connection unit 34 to the head node 80.

During the switch period of the switch module 50, without the connection of the first output circuit 20 and the second output circuit 30 to the power input circuit 10, there will be several milliseconds that the whole system is in the power-off state. Then the spare power Ps1 (voltage V1) provided by the spare power module 61 will be transmitted through the second output circuit 30 to the head node 80, thereby maintain the normal power supply condition of the voltage V1 part of the head node 80.

The power supply device of the present invention may be practically configured on a power switch board, without the spare power module disclosed in the former embodiments limited thereon. On a premise that the circuit connections of the spare power module according to the present invention are not changes, the spare power module may be configured on the head node, or implemented outside the head node or the power switch board independently.

Furthermore, the switch signal Sw may be transmitted to some GPIO (general purpose input/output) pin of some specific controller on the head node 80 as a signal or command source for the operating system of the cluster computer to process interruption tasks. As to the switch 55 applied in FIG. 2, it can be configured between the first output circuit 20 and the spare power module 60 in FIG. 3 by demand.

Figure 4:
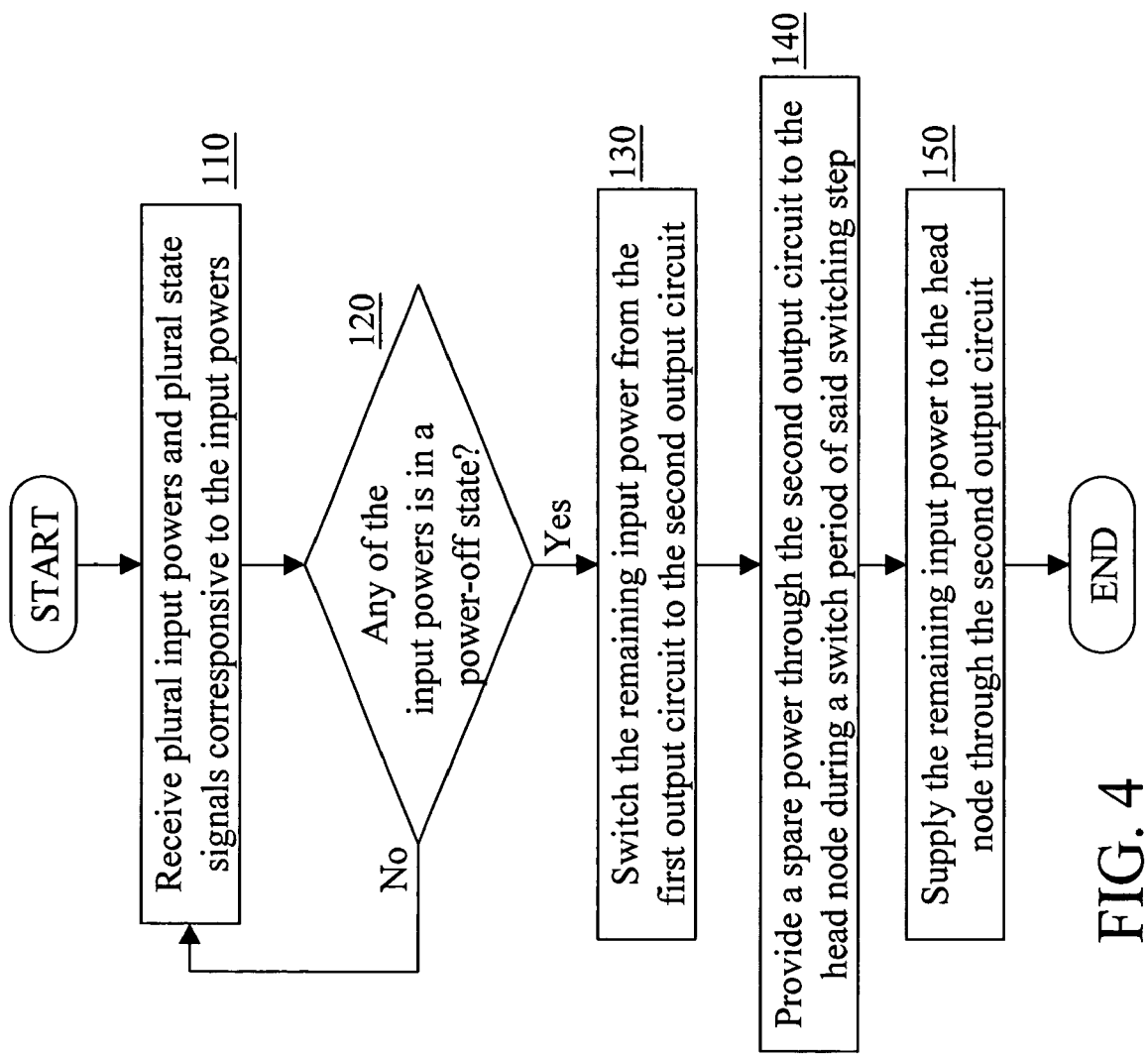
FIG. 4 is a flow chart of a power switch method for cluster computer according to the present invention.

Please refer to FIG. 4, which illustrates a flow chart of a power switch method for cluster computer. According to the power supply device disclosed in the former embodiment, the power switch method of the present invention basically related to a power supply mechanism for a head node and plural compute nodes of the cluster computer when any of the power suppliers is under the power-off state. The method includes the following steps.

Step 110: First, receive the input powers (P1, P2 . . . ) and the corresponsive state signals (S1, S2 . . . ). Each of the state signals is provided to indicate whether the input powers are in the power-on state or the power-off state, and also to be integrated by the switch module to generate the switch signals. Meanwhile, the sum of the output powers of the input powers equals to the sum of the overall operation powers of the whole cluster computer (the head node and all the compute nodes) plus a safe value. In another word, any of the input powers is not capable of independently supplying the overall electricity requirement of the whole cluster computer.

Step 120: Confirm according to the state signal whether any of the input powers is in the power-off state. The state signals may be used to decide whether each of the input powers is supplied normally. If all the input powers are in the power-on state, their corresponsive state signal will be in a specific logic voltage level of the power-on operation (such as the signal PWRON_L under logic LOW), and then the system will go back to the step 110 to continuously receive the following input powers and the state signals. Meanwhile, the output power will be kept inputting to the first output circuit. Oppositely, if any of the input power is in the power-off state, its corresponsive state signal will be in a specific logic voltage level of the power-off operation (such as the signal PWRON_L under logic HIGH), thereby generating the switch signal Sw to proceed the switch operation of the power supply mechanisms. Between the steps 120 and 130, a step of generating the switch signal according to the state signals may be further included.

Step 130: When any of the input power is in the power-off state, the remaining input power will not be able to independently supply the overall electricity requirements of the whole cluster computer. Hence the remaining input power should be switched from the first output circuit that serves the whole cluster computer, to the second output circuit that serves the head node only. That switch operation has to be performed according to the switch signal.

Step 140: Since the switch module needs the switch period of said switching step 130 to switch from the first output circuit to the second output circuit, the spare power (Sw) will be provided through the second output circuit to the head node. To avoid the spare power being provided to the first output circuit, the supplied subject that the spare power is provided to may be limited. Namely, a step of preventing the spare power from supplying to the first output circuit may be further included.

Step 150: When the switch module has switched the remaining input power from the first output circuit to the second output circuit, the remaining input power will be able to provide to the head node.

In the aforesaid embodiment, the cluster computer takes the first output circuit as the predetermined power supply path. Therefore the power switch method of the present invention further includes a step of charging a spare power module by the first output circuit for storing the spare power when all the input powers are in the power-on state. When any of the input power is in the power-off state, the system will be switch to use the second output circuit to supply electricity to the head node, while during the switch period the spare power module will serve the head node. Additionally, the second output circuit will be capable of charging the spare power module after the switch operation.

In the condition that the second output circuit serves the head node with all of the compute node shut-down, if the interrupted power supplier is replaced and back in service (all the input powers return to the power-on state), then the switch module is possibly to be switched according to the state signal back to the first output circuit for serving the whole cluster computer. Provided with enough capacitance, during the switch period of switching from the second output circuit back to the first output circuit, the head node may possibly be served by the spare power module.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power switch device for a cluster computer, comprising:

a power input circuit, receiving a plurality of input powers, each having a power-on state or alternatively a power-off state, and a plurality of state signals, each corresponding to a respective one of the input powers;

a first output circuit, supplying electricity to a head node and at least one compute node of the cluster computer;

a second output circuit, supplying electricity to the head node;

a gate, generating a switch signal according to the state signals;

at least one switch module, being responsive to the switch signal, electrically connecting the power input circuit to the first output circuit if all of the plurality of input powers are in the power-on state, and to the second output circuit if at least one of the plurality of input powers is in the power-off state; and at least one spare power module, electrically connecting to the first output circuit and the second output circuit, the spare power module being charged through the first output circuit and storing a spare power, the spare power being provided to the second output circuit during a switch period of the switch module.

2. The power switch device of claim 1, wherein the input powers and the state signals are provided by a plurality of power suppliers.

3. The power switch device of claim 2, wherein the sum of the output powers of the power suppliers equals to the sum of the output powers required by the head node and the compute node plus a safe value.

4. The power switch device of claim 1, wherein the spare power module comprises at least one capacitor.

5. The power switch device of claim 1, further comprising a switch connected between the first output circuit and the spare power module to limit the current direction thereof.

6. The power switch device of claim 1, wherein the switch module comprises a relay.

7. The power switch device of claim 1, wherein the power switch device is configured on a power switch circuit board.

8. The power switch device of claim 7, wherein the spare power module is configured on the head node, or independently configured outside the head node and the power switch circuit board.

9. The power switch device of claim 1, wherein the gate comprises an AND logic gate.

10. The power switch device of claim 1, wherein the power input circuit comprises a plurality of input connection units for receiving the input powers and the state signals.

11. The power switch device of claim 10, wherein the power input circuit comprises a DC (direct current) voltage distribution circuit electrically connecting to the input connection units to divide the input powers into various DC voltages and to transmit the DC voltages to the switch module.

12. The power switch device of claim 1, wherein the first output circuit comprises:
a first distribution circuit, electrically connecting the switch module and the spare power module; and
at least one first output connection unit, electrically connecting the first distribution circuit, the head node and the compute node.

13. The power switch device of claim 1, wherein the second output circuit comprises:
a second distribution circuit, electrically connecting the switch module and the spare power module; and
at least one second output connection unit, electrically connecting the second distribution circuit and the head node.

14. A power switch method applying to a first output circuit and a second output circuit of a cluster computer, the first output circuit supplying electricity to a head node and at least one compute node of the cluster computer, the second output circuit supply electricity to the head node, the method comprising the steps of:
receiving a plurality of input powers, each having a power-on state or alternatively a Dower-off state, and a plurality of state signals, each corresponding to a respective one of the input powers;
confirming according to the state signals whether any of the input powers is in the power-off state; and if at least one of the plurality of input powers is in the power-off state:
switching the remaining input power from the first output circuit to the second output circuits;
providing a spare power through the second output circuit to the head node during a switch period of said switching step; and
supplying the remaining input power to the head node through the second output circuit.

15. The method of claim 14, wherein the input powers are input to the first output circuit when all the state signals indicate all the input powers are in the power-on state.

16. The method of claim 15 further comprising a step of charging a spare power module by the first output circuit for storing the spare power when all the input powers are in the power-on state.

17. The method of claim 14, wherein the step of confirming according to the state signals whether at least one of the input powers is in the power-off state, further comprises a step of generating a switch signal according to the state signals.

18. The method of claim 17, wherein the remaining input power is switched from the first output circuit to the second output circuit according to the switch signal.

19. The method of claim 14 further comprising a step of preventing the spare power from supplying to the first output circuit.

* * * * *